(12) United States Patent
Sermanoukian

(10) Patent No.: US 12,299,525 B2
(45) Date of Patent: May 13, 2025

(54) APPARATUS, SYSTEM, AND METHOD FOR PROVIDING A SMART CONTAINER

(71) Applicant: NYPRO INC., Clinton, MA (US)

(72) Inventor: Edouard Sermanoukian, St. Petersburg, FL (US)

(73) Assignee: NYPRO INC.

( * ) Notice: Subject to any disclaimer, the term of this patent is extended or adjusted under 35 U.S.C. 154(b) by 27 days.

(21) Appl. No.: 18/039,943

(22) PCT Filed: Dec. 2, 2021

(86) PCT No.: PCT/US2021/061659
§ 371 (c)(1),
(2) Date: Jun. 1, 2023

(87) PCT Pub. No.: WO2022/120083
PCT Pub. Date: Jun. 9, 2022

(65) Prior Publication Data
US 2023/0409851 A1    Dec. 21, 2023

Related U.S. Application Data

(60) Provisional application No. 63/120,637, filed on Dec. 2, 2020.

(51) Int. Cl.
*G06K 7/10* (2006.01)
*G06K 19/077* (2006.01)

(52) U.S. Cl.
CPC ..... *G06K 7/10425* (2013.01); *G06K 19/0776* (2013.01); *G06K 19/07773* (2013.01)

(58) Field of Classification Search
CPC ........... G06K 7/10425; G06K 19/0776; G06K 19/07773
See application file for complete search history.

(56) References Cited

U.S. PATENT DOCUMENTS

| | | | |
|---|---|---|---|
| 8,766,777 B2* | 7/2014 | Hinman | G01S 5/04 342/368 |
| 10,572,701 B2* | 2/2020 | Ganesan | G06K 7/10316 |
| 2010/0140345 A1 | 6/2010 | Sakamoto et al. | |

(Continued)

OTHER PUBLICATIONS

International Search Report for PCT/US2021/061659, dated Apr. 7, 2022.

(Continued)

*Primary Examiner* — Mohamed Barakat
(74) *Attorney, Agent, or Firm* — Riverside Law LLP

(57) ABSTRACT

Apparatuses, systems and methods of providing a smart container. The smart container contains a consumable, and includes: a container body; a label affixed to the container body; and a passive sensing tag (PST) embedded in the label. The PST includes: a backscatter antenna; a radio-frequency identification (RFID) communicative with the backscatter antenna; and at least one sensor communicative with the backscatter antenna. Responsive to a ringing from a radio frequency transceiver, the backscatter antenna provides the RFID and data from the at least one sensor. The RFID and the data are then processed to provide usage information of the consumable to a user via a dashboard available at least on a smartphone and on a desktop.

14 Claims, 7 Drawing Sheets

(56) References Cited

U.S. PATENT DOCUMENTS

| | | | |
|---|---|---|---|
| 2012/0322380 A1* | 12/2012 | Nannarone | G08B 21/0275 |
| | | | 455/67.11 |
| 2017/0229000 A1* | 8/2017 | Law | G06K 19/0717 |
| 2017/0337347 A1 | 11/2017 | Chu | |
| 2019/0114731 A1 | 4/2019 | Lowenstein | |
| 2019/0259482 A1 | 8/2019 | Puirava | |
| 2020/0111556 A1 | 4/2020 | Schmidlin et al. | |
| 2020/0117863 A1* | 4/2020 | Ha | G06K 19/07771 |
| 2020/0143930 A1* | 5/2020 | Catchings | G06K 19/07773 |
| 2020/0349328 A1* | 11/2020 | Espinosa | G06Q 10/00 |
| 2020/0364421 A1* | 11/2020 | Wappler | G06K 7/10316 |
| 2022/0077888 A1* | 3/2022 | Macor | H04B 5/77 |

OTHER PUBLICATIONS

Written Opinion of the International Searching Authority for PCT/US2021/061659, dated Apr. 7, 2022.

\* cited by examiner

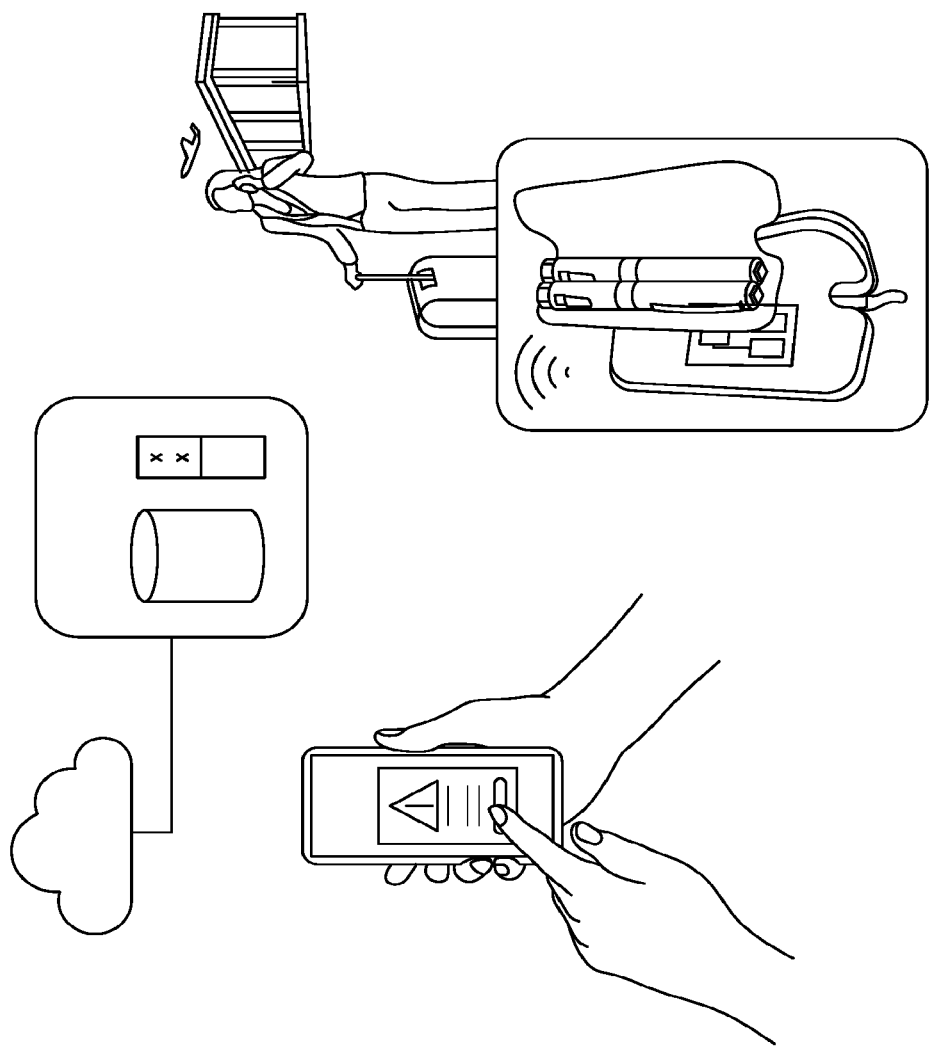
FIG.5A
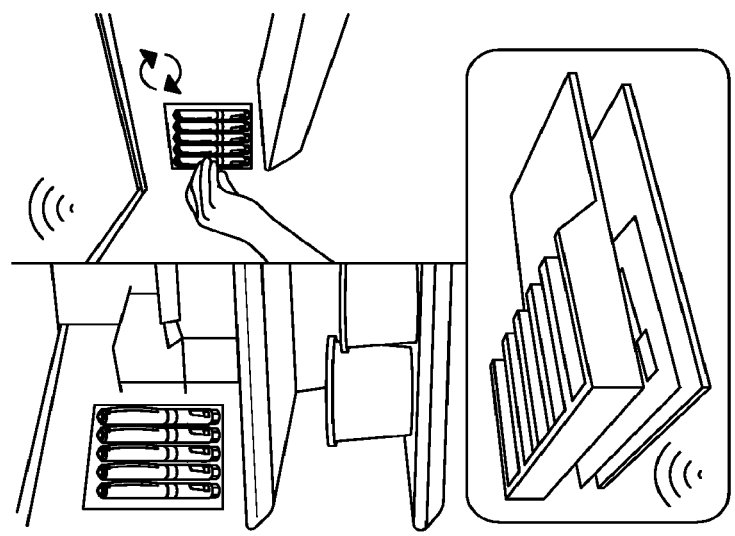

APPARATUS, SYSTEM, AND METHOD FOR PROVIDING A SMART CONTAINER

CROSS-REFERENCE TO RELATED APPLICATIONS

The present application claims benefit of priority to International Application No. PCT/2021/061659, filed Dec. 2, 2021, entitled: "Apparatus, System, and Method for Providing a Smart Container," which claims priority to U.S. Provisional Application No. 63/120,637, filed Dec. 2, 2020, entitled: "Apparatus, System, and Method for Providing a Smart Container," the entirety of which is incorporated herein by reference as if set forth in its entirety.

BACKGROUND

Field of the Disclosure

The disclosure relates generally to sensing of a consumables, and, more particularly, to an apparatus, system, and method of providing a smart container.

Description of the Background

In the modern economy, certain consumable products may require a certain usage amount to work properly, and rationing prior to replenishment is undesirable due to the likely failure of the product to work in the incorrect amount. As such, it is highly desirable that such products be ordered online, and also be replenished upon consumption via online ordering and delivery.

Furthermore, it is well understood that various types of container contents are designed to be dispensed over extended time periods and/or have an extended shelf life, particularly under certain conditions, and/or must be stored under certain conditions. In general, there are no readily available tracking methodologies for the dispensing of or conditions of those contents, nor are there tracking methods to automatically indicate when more of the consumable, or more inventory of the consumable, is needed without the need to ration the consumable, or when the state of the consumable is unacceptable due to the conditions extant around the consumable.

Therefore, the need exists for an apparatus, system, and method of providing a smart container capable of monitoring the characteristics of the consumable therein.

SUMMARY

Disclosed are exemplary apparatuses, systems and methods of providing a smart container. The smart container contains a consumable, and includes: a container body; a label affixed to the container body; and a passive sensing tag (PST) embedded in the label. The PST includes: a backscatter antenna; a radio-frequency identification (RFID) communicative with the backscatter antenna; and at least one sensor communicative with the backscatter antenna.

Responsive to a ringing from a radio frequency transceiver, the backscatter antenna provides the RFID and data from the at least one sensor. The RFID and the data are then processed to provide usage information of the consumable to a user via a dashboard available at least on a smartphone and on a desktop.

Therefore, the embodiments provide apparatuses, systems and methods of providing a smart container capable of monitoring the characteristics of the consumable therein.

BRIEF DESCRIPTION OF THE DRAWINGS

The disclosure is provided using the text herein, as well as the accompanying drawings, in which like numerals may represent like elements, and in which.

DETAILED DESCRIPTION

Figure 1:
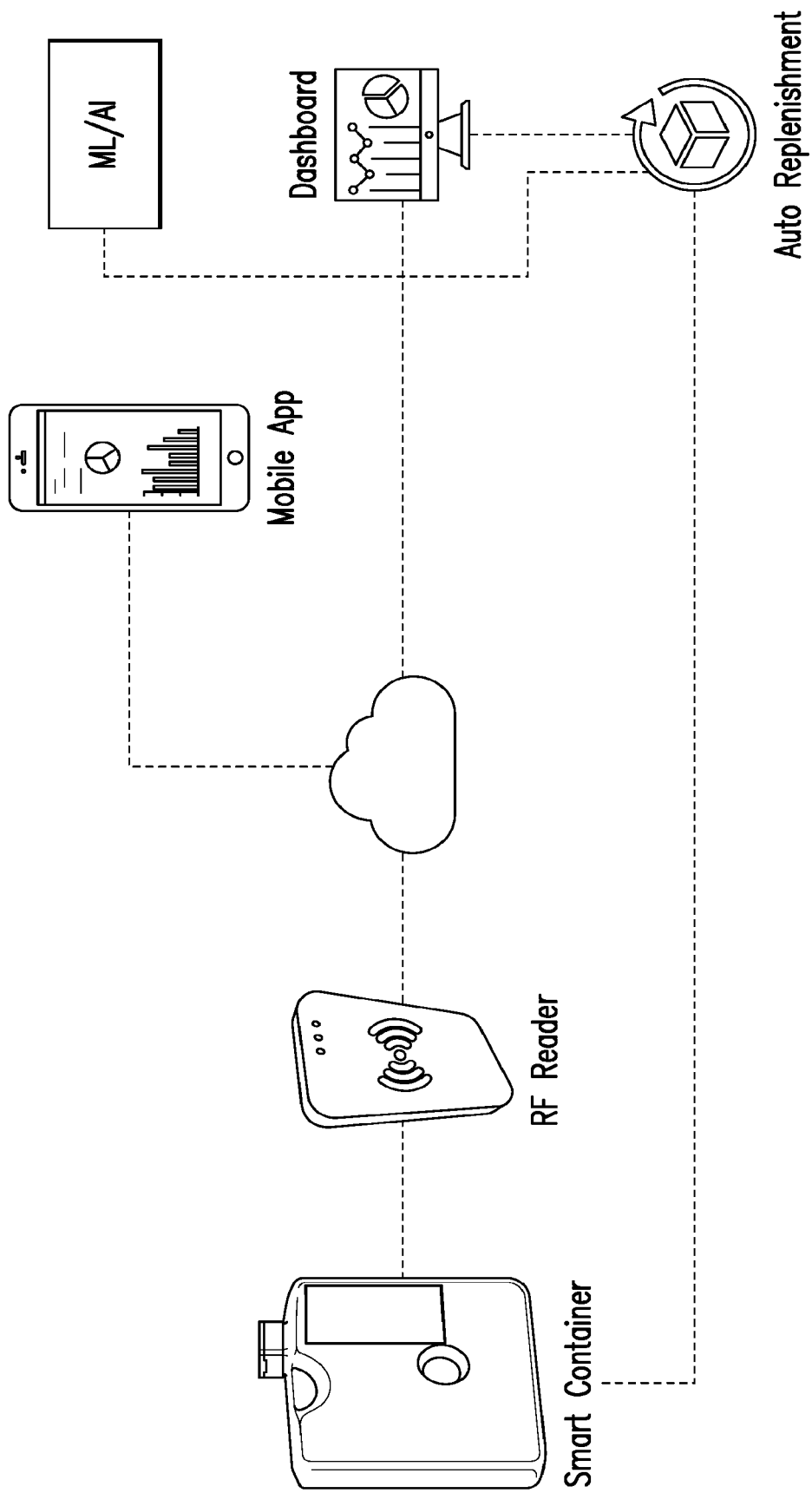
FIG. 1 is an illustration of aspects of the embodiments.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules and systems are disclosed herein that may provide access to and transformation of a plurality of types of digital content, including but not limited to algorithms, triggers, and data streams, and the particular algorithms applied herein may track, deliver, manipulate, transform, transceive and report the accessed data. Described embodiments of the modules, apps, systems and methods that apply these particular algorithms are thus intended to be exemplary and not limiting.

An exemplary computing processing system for use in association with the embodiments, by way of non-limiting example, is capable of executing software, such as an operating system (OS), applications/apps, user interfaces, and/or one or more other computing algorithms, such as the tracking, algorithms, decisions, models, programs and subprograms discussed herein. The operation of the exemplary processing system is controlled primarily by non-transitory computer readable instructions/code, such as instructions stored in a computer readable storage medium, such as hard disk drive (HDD), optical disk, solid state drive, or the like. Such instructions may be executed within the central processing unit (CPU) to cause the system to perform the disclosed operations. In many known computer servers, workstations, mobile devices, personal computers, and the like, the CPU is implemented in an integrated circuit called a processor.

It is appreciated that, although the exemplary processing system may comprise a single CPU, such description is merely illustrative, as the processing system may comprise a plurality of CPUs. As such, the disclosed system may exploit the resources of remote CPUs through a communications network or some other data communications means.

In operation, CPU fetches, decodes, and executes instructions from a computer readable storage medium. Such instructions may be included in software. Information, such as computer instructions and other computer readable data, is transferred between components of the system via the system's main data-transfer path.

In addition, the processing system may contain a peripheral communications controller and bus, which is responsible for communicating instructions from CPU to, and/or receiving data from, peripherals, such as operator interaction elements, as discussed herein throughout. An example of a peripheral bus is the Peripheral Component Interconnect (PCI) bus that is well known in the pertinent art.

An operator display/graphical user interface (GUI) may be used to display visual output and/or presentation data generated by or at the request of processing system, such as responsive to operation of the aforementioned computing programs/applications. Such visual output may include text, graphics, animated graphics, and/or video, for example.

Further, the processing system may contain a network adapter which may be used to couple to an external communication network, which may include or provide access to the Internet, an intranet, an extranet, or the like. Communications network may provide access for processing system with means of communicating and transferring software and information electronically. Network adaptor may communicate to and from the network using any available wired or wireless technologies. Such technologies may include, by way of non-limiting example, cellular, Wi-Fi, Bluetooth, infrared, or the like.

As illustrated in FIG. 1, the embodiments provide a smart container. The container may be non-metal, such as being plastic, glass or paper, although metal containers may also be employed in some embodiments. The container may contain a liquid or a solid. The liquid may be of varying viscosity, and the solid may be, by way of non-limiting example, a powder, a gel or gummy, or any other solids type.

The label may have at least one a sensor associated with a RFID system in order to detect characteristics of the container. As used throughout, the label having at least one sensor may include contexts ranging from the entire label comprising the sensor, to the sensor being adhered to the label after label construction. Characteristics sensed may include types of material/contents in the container, level of material, temperature of the material, fluid/solid density/characteristics inside container, hence enabling the identification of the content inside the container, etc., by way of non-limiting example.

In an embodiment, the sensor may be or include a printed antenna on a substrate. The printed antenna may be glued onto, mounted, screwed, or otherwise adhered using any known means to the outer surface of a container.

Antenna performance (i.e., gain and efficiency) depends on the carrier wavelength/frequency, as will be understood to the skilled artisan. For example, the carrier wavelength ($\lambda$) for 900 MHz carrier frequency is about 33 cm (~1 ft). Accordingly, the dipole/backscatter antenna discussed throughout should be sized as a fraction of the wavelength. For example, and antenna of $5\lambda/14$ achieves optimal gain; a $\lambda/2$ is very common to balance gain and efficiency; a $\lambda/4$ provides lesser efficiency. As used herein, antennae may alternately be referenced as antenna, backscatter antenna, or dipole antenna.

The disclosed detection may be passive, so as to avoid the need for on-board power, such as a battery, which would add to the requisite expense, although active sensors may also be employed. In short, a RF transceiver "rings" a passive RF tag associated with the container. The gain and phase shift of the response by the RF tag to the ringing provides information from which the characteristics of the container may be discerned.

More specifically, the gain and phase shift may be indicative of primary characteristics of the container. Such primary characteristics may reflect the level of material in the container, such as may be gleaned directly or indirectly, such as using the sensed density or volumetric level of the container, the opacity to RF of the container, the volume of air inside the container, and the like. The density of the consumable may be a key component, for example, regarding a variety of characteristics, quality control, and brand protection, such as by providing anti-counterfeiting mechanisms. By way of non-limiting example, the density of a beverage, even in a full container, may vary according to the sugar content of the beverage. As such, a measure of the density may enable substantially improved quality control of the beverage therewithin.

By way of example, the density of orange juice in a container may be in a particular range if the sugar amount is sufficient, but may be outside of that density range if the sugar level is insufficient or excessive. Similarly, a counterfeit orange juice may be sold in a replica container, but may have 50% more water than the actual brand should have, and this deficiency, and thus the counterfeit nature of the orange juice may be detected using density sensing. Density or other types of sensing, as discussed herein, may likewise protect consumers from counterfeit baby formula that may include dangerous elements, or medications that may lack efficacy or be dangerous, by way of example.

The primary characteristics referenced above are then comparatively processed into the container's characteristics by one or more processing systems. That is, the primary characteristics may be compared to numeric ranges previously deemed indicative of certain actual characteristics, and the container may then be assigned those certain actual characteristics by the processing system.

This comparative calibration may be built using the machine learning discussed below. The building of the comparative profile by the machine learning allows for environmental noise (i.e., nearby phones, microwaves, BLE, RF, nearby container sensors, and so on), packaging inconsistencies, and the like to be accounted for in the calibration of the comparisons.

The comparative numeric ranges deemed indicative of the actual characteristics may be manually entered, or may be developed over time, such as by machine learning. That is, for various actual characteristics, the sensing system may read the primary characteristics, and may estimate the actual characteristics therefrom. Thereafter, a feedback mechanism, which may be automated or manual, may assess the propriety of the estimate of the actual characteristics, such as back to the machine learning. Over time, modification to the comparative logic thus leads asymptotically towards 100% correct estimation of the actual characteristics.

More particularly, the comparative logic is based on maximum likelihood, and changes based on collected datasets, such as using regression or classification methods. Accordingly, the larger the dataset, the less likely it is that misclassification occurs.

Accordingly, training of the artificial intelligence (AI) that performs the machine learning may be required. In so doing, error-spotting may be performed, such as manually or automatically, regarding the propriety of the characteristics of the consumable in question as assessed by the AI/machine learning. Of course, the machine learning thereby occurs not only in relation to the product in the container, but additionally in relation to the other circumstances related to the container. For example, a cardboard container may react in a certain way in a hot and humid environment as compared to a cool, climate controlled environment.

Figure 2:
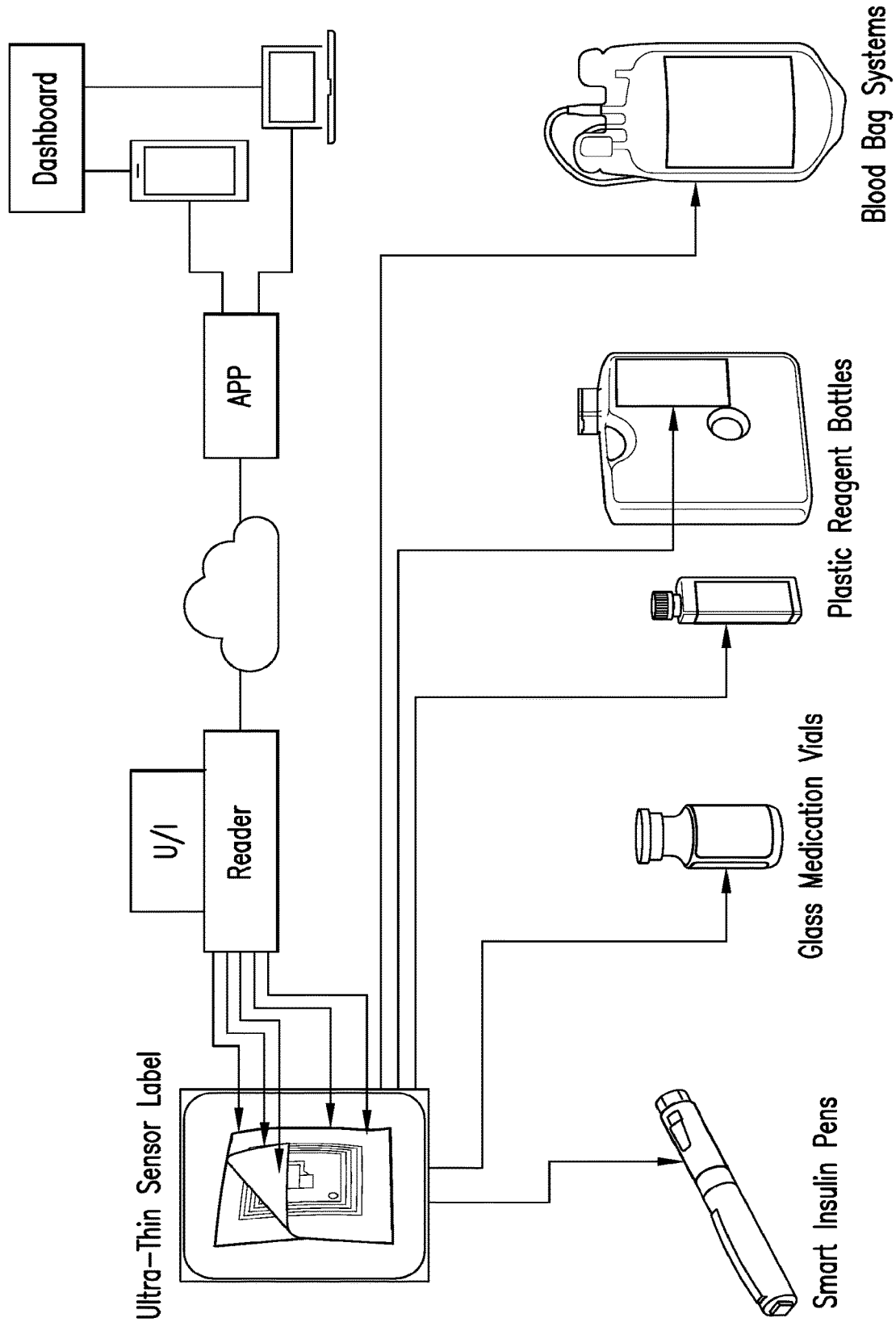
FIG. 2 is an illustration of aspects of the embodiments.

As is further illustrated in FIG. 2, the embodiments may include a sensing label associated with a container of consumable(s) (although non-consumables or non-containers may also be sensed, such as an embodiment wherein the sufficiency of detergent in a washing machine is sensed), and an application, such as may include a cloud-connective application and/or a mobile "app", to allow for the assessment of characteristics of the container, the consumable(s), and/or the environmental conditions in which the container resides. The application and/or the "app" may provide a dashboard to enable user interaction with the characteristics, such as by providing an interface to the machine learning, which allows for discerning of the characteristics. The application and/or app may be platform and operating system independent, and as such may be operable on iOS, Windows, Linux, and/or Android—based platforms and systems, by way of non-limiting example.

Sensed characteristics may include: temperature; humidity; level of fluid or solid; sensing; need for replenishment or auto-replenishment; product authenticity; occurrence of tampering; product expiration; and inventory. Additional sensing may include: motion sensing; vibration sensing; GPS locating; light or UV sensing; and intelligent counting (of containers or content within a container, for example).

With regard to the container, the sensing suite should not make direct contact with the contained solid, liquid or solution, so as to avoid contamination of the consumable contents and so as to avoid unnecessary expense in waterproofing or airproofing the sensing suite. The container may be opaque, translucent, or transparent. The sensing suite should be operable on a contained consumable of any color or density.

In preferred embodiments, the sensing suite are embedded in, printed or placed upon, or otherwise associated with the container's label. The sensors may be, for example, disposable and associated after manufacture of the container, or after purchase of the container. Additionally and alternatively, the sensors may have at least a portion thereof embedded in an adhesive-backed label suitable for permanent application to a container.

The container may be rigid, semi-rigid, or flexible, such as a medical fluid bag. The container may preferably be non-metallic, so as to avoid interference with the function of the sensor suite, although metallic containers may also be employed. The container may be of any of various sizes, geometries, wall thicknesses, colors, and/or transparency/opacity.

Each container type and/or size may have a unique label and sensor design. However, some label and sensor combination designs may be standardized, such as by size (S/M/L/XL) or container-content type, so as to work across multiple applications.

In embodiments, the sensing suite may be passive. That is, sensors may preferably not utilize a battery or a like-power source. Other sensors may be active, i.e., powered. Each sensor in the sensing suite may have a certain operating range for sensing the quantity desired in association with the container and/or the consumable. By way of example, a temperature sensor may operate in a temperature range of 0 C to +30 C, ±1 C; a humidity sensor may operate in a humidity range of 0 to 100% HR, ±3%.

The sensor suite should have minimal impact on the physical size and/or thickness of the label and/or the container. The sensor suite may be corresponded to the length, width, and/or thickness of the container. For example, the sensing may accommodate a longer volume sensor read, such with a bottle or a blood bag.

The sensor reader may be compatible with a variety of platforms and operating systems, such as may include iOS, Windows, Android, or the like. The sensor reader may wirelessly communicate, such as using the aforementioned platform or operating system, via any of various communication methodologies, including but not limited to RF, Bluetooth, NFC, Wifi, cellular, or the like, with a mobile device, communications hub, and so on.

Similarly, the reader may read the sensor data wirelessly, such as via any of various communication methodologies, including but not limited to RF, Bluetooth, NFC, Wifi, cellular, or the like. The reader may be capable of reading the sensor data in a given distance range, such as from a minimum distance of 1 inch to a maximum distance of 12 feet.

The reader may be rechargeable, such as using a battery and receiving power via a charging port, such as a USB charging port, and/or may operate using utility power. The reader may operate continuously whenever it receives power in some embodiments, whenever it receives a signal from the app or the cloud, or may operate only when it receives utility power in other embodiments.

The reader may include various alerts or indicators, such as audio, visual, and/or audio-visual indicators. For example, the reader may include status LEDs. For example, a green steady LED may indicate that the reader is ready, a green flashing LED may indicate that the reader is reading, and a blue flashing LED may indicate that the reader is transmitting data.

By way of additional example, the reader may include a user interface such as a LCD display to display the latest sensor readings. Also displayed on the user interface may be identifying information of the reader, as well as networking and data transfer information. For example, data transmission from the label to the reader may have a certain tolerance range, such as less than one second, and compliance with this tolerance may be monitored and/or displayed on the user interface. Further, the reader may be programmed to upload data during reading, after each read, or after a predetermined number of reads, either to a mobile app, to the cloud, or the like. However, upon a loss of connectivity, the reader may store up to a predetermined number of readings, such as 5, until connectivity is regained, and this queueing of data may be reflected on the user interface.

Download speeds may vary, such as based on the application. For example, the application may dictate the speed, urgency and/or frequency necessary for transmission of the characteristics discussed throughout.

The cloud solution to which the reader may upload data may be platform independent. Moreover, either the reader may communicate to the cloud, which may in turn communicate to a mobile app from the cloud solution, or the reader may communicate directly to the mobile app, as discussed throughout.

In each such case, a dashboard may be provided to a user, which may have additional information not available on the user interface at the reader discussed above. For example, the dashboard may provide a display table with historical readings and latest readings; graphical tables of sensor statistics and networking statistics; manual controls and/or automated alerts for auto-replenishment; and verification and statistics regarding the maintenance of data security.

As discussed throughout, a centralized control center may reside in the cloud. The centralized control center may take all incoming data from a plurality of sensing systems, may perform analytics and predictive analysis thereon, may perform forecasting, and may send critical/long lead time items to the disclosed auto-replenishment system. This data may be anonymized and may provide wholistic use data across entire industries, for example.

As referenced, the dashboard, whether on a mobile device or a desktop device, may provide not only tracked statistical information, but my additionally provide a variety of alerts and threshold tracking, for example. By way of example, the dashboard may track when medication/fluid in a container reaches or is held at a predefined fluid level, temperature level, or humidity level. The dashboard may also issue an alert when medication/fluid in a container is tampered with (such as may be evidenced by the sensing of a damaged seal) or refilled (such as may be evidenced by the sensing of new fluid being added to empty or partially empty container). Yet further, the software of the dashboard, in conjunction with the sensing and firmware, may track thresholds, such as timing, such as wherein medication/fluid in a container has reached its expiration.

Figure 3:
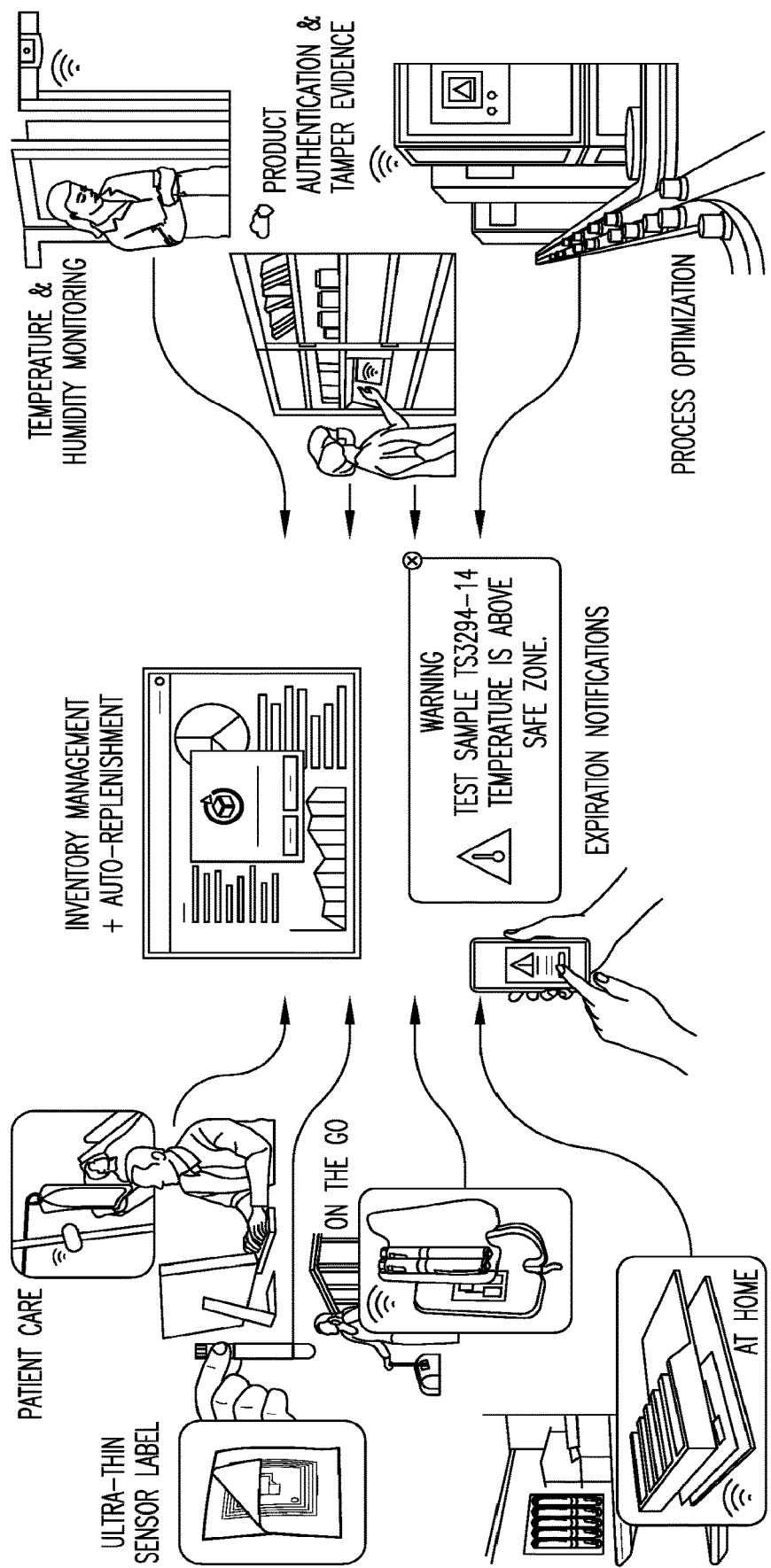
FIG. 3 is an illustration of aspects of the embodiments.

Of course, a variety of use circumstances of the embodiments may be made, as illustrated in FIG. 3. In addition to known embodiments in which a need to sense a level, and other characteristics, of a consumable in a container arises, the embodiments may allow level sensing for myriad uses. For example, in relation to reagent cartridges, the embodiments may include monitoring and sensing the handling and/or usage of such cartridges, including in a laboratory environment. Further, the embodiments may allow for sensing of drug, blood, and other bodily fluid containers, such as with regard to: caregiver use of infusion bags; use of renal dialysis solution containers; storage of blood collection containers; patient use of insulin cartridges for pumps and pens; and use and storage of autologues skin cell graft containers. Likewise, the embodiments may monitor the consumer use of contact lens containers and cleaning agents, and/or may monitor insulin pens both at home and when in transit.

The disclosed sensing system and/or reader may thus be applicable in any of a variety of contexts in which consumable (or non-consumable) contents are within a container which may have associated therewith a label-based sensor. As such, the various contexts may require sensing of one or multiple different aspects related to the container, dependent upon what is contained in the container, as well as alerts and messages related to those various different aspects. For example, a medication of an improper formulation or dosage may necessitate an immediate alert to a user, while a watered-down orange juice may simply necessitate an alert to a manufacturer. Thus, by way of non-limiting example and dependent upon the sensing context, sensed aspects may include a fluid level sensor, a temperature sensor, and/or a humidity sensor, and alerts related to the same.

Figure 4:
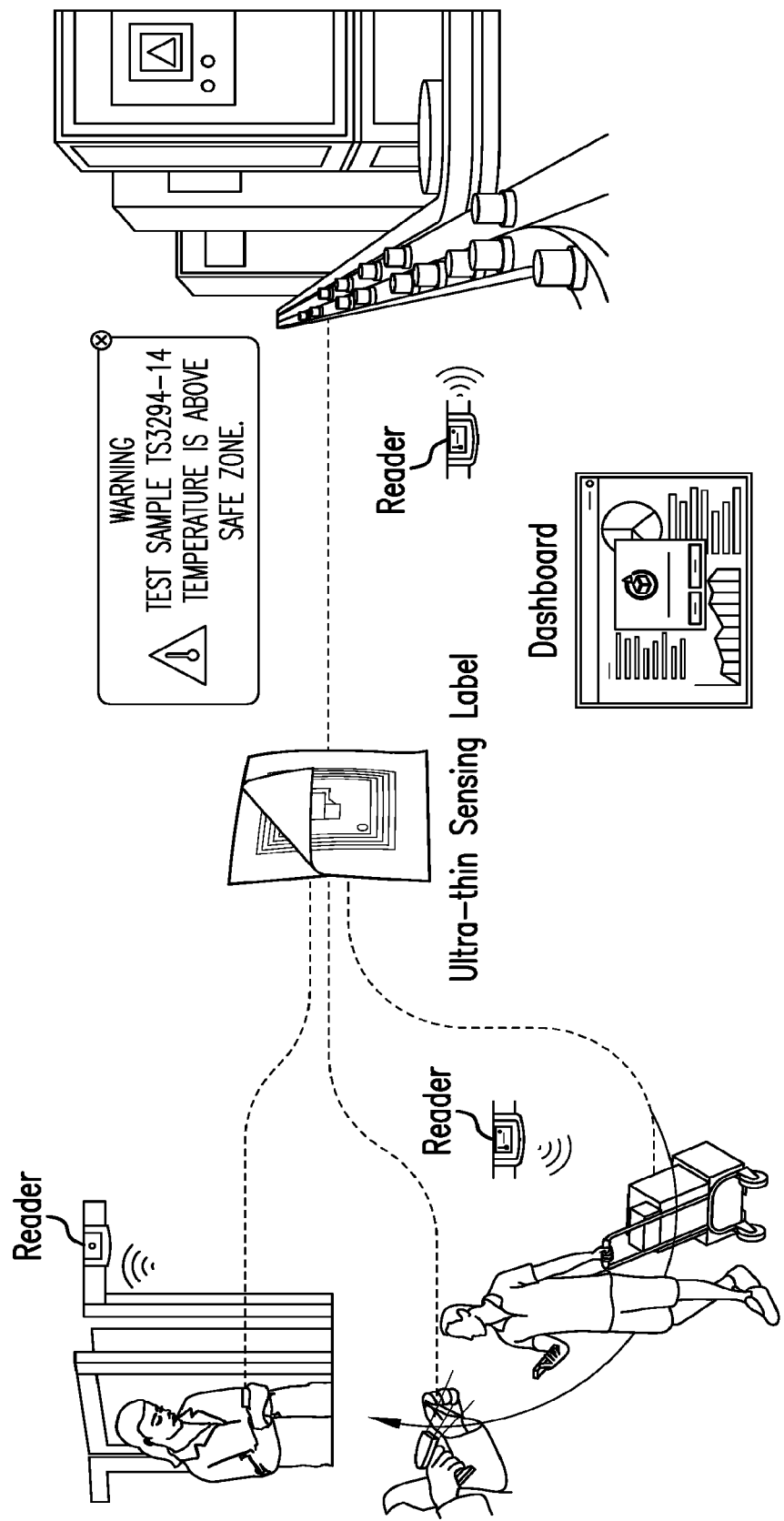
FIG. 4 is an illustration of aspects of the embodiments.

As detailed in the embodiment of FIG. 4, a fluid level sensor may comprise an antenna circuit laid on a flat sheet, such as a label. The antenna may or may not have associated therewith a RFID of either the consumable or the container, such as may indicate the consumable contained, the volume, and relevant tolerance ranges, and the antenna may enable communication with the disclosed monitoring/data system.

The label having the antenna therein may be adhered to a container. The antenna circuit may comprise, in part, a Passive Sensing Tag (PST), by way of non-limiting example. A PST is generally understood to generate transmissions of data, such as including the aforementioned RFID, using backscatter communication. The transmissions are decoded by a radio transceiver, such as the reader discussed herein. As such, the label with the antenna therein may have no active power associated therewith.

The reader may be a distinct device, or may be embedded in an appliance or another device such as may be an Internet of Things (IoT) device. The reader may send a RF signal to the PST. If this signal is sent from a certain distance, the RF signal energizes the PST antenna, thereby "ringing" the PST such that a return signal is generated from the PST.

The embodiments may provide "smart" appliances, storage, dispensers, etc., using IoT connectivity according to the afore-discussed embodiments. For example, a refrigerator may include a reader that monitors fluid containers (and, More specifically, the sensor labels of those containers) that are stored within the refrigerator. Accordingly, the IoT refrigerator can thereby detect, for example, if that orange juice is below 50% full, and that the milk is expired, and may either send an alert to the disclosed app and/or execute an auto-replenishment order.

The reader captures the return signal, via its own antenna, filters the noise resident in the return signal, and converts the return signal to a container fluid level. This conversion may occur using pre-calibration training and an associated machine-learning algorithm, such as with an automated or manual feedback check.

Of course, the skilled artisan will appreciate that the PST and the reader may also detect solids or powder levels instead of or in addition to a fluids/liquid level. Yet further, the embodiments may also detect the type of consumable content inside the container, such as by leveraging the AI/machine learning algorithm(s). These aspects may be advantageous for product authentication and tamper detection, such as in the healthcare, packaging, food and safety industries.

The level assessment, along with the other referenced aspects, may be obtained in the embodiments without making any contact with the contents of the container. This avoids potential contamination of the contents, and increases the ease of manufacturability of the container with its contents.

Similarly, a temperature sensor may be provided to communicate using the antenna circuit on the flat label sheet. In this example, the reader captures the return signal, filters noise therefrom, and converts the return signal to temperature using its pre-calibration training and subsequent machine learning and feedback.

By way of further example, a humidity sensor may be provided along with the antenna circuit on the flat sheet, such as with or without the additional temperature sensor. The reader may then capture the return signal, filter the noise therefrom, and may convert the return signal to a humidity reading using its pre-calibration training and subsequent machine learning and feedback.

The foregoing is intended to provide a limited number of examples of sensor types that may be associated with, or communicate using the antenna of, a flat label. Such sensors may be PST or active. By way of example, other sensors, such as an accelerometer or gyroscope to track container activity/movement, may also or instead be associated with the label to provide a return signal via the antenna when rung by the reader.

For example, certain products should not be subjected to vibration or shock, and such products must thus be subjected to sensing vibration. Moreover, an alert may occur if a product is deemed to be moved or located in a place that it should not be.

More particularly, the embodiments may allow for the monitoring of consumable items. Moreover, optimally-timed auto-replenishment eliminates the need to unnecessarily take up space in one's home, in hospitals, in doctor's offices, and the like, storing containers until the contents are needed; or to have to ration consumables until a replenishment can be obtained. As part of, or in addition to, this space management, inventory management may more broadly occur. Similarly, user alerts, based on monitoring of use and storage environments, increase consumable's safety.

The container may be or include, by way of non-limiting example, a bottle, cartridge, bag, jar (such as with a closure), a box (such as may be formed of cardboard), a sealed or re-sealable package, or the like. The consumable may have associated therewith an aspect of a sensor, such as at least a RF antenna and an RFID, such as in a label. The label may be associated during manufacture (at which time the label may be assigned a serial number, a lot number, manufacturer information, expiration information, date codes, and so on), during delivery, by a retailer, or by a consumer, by way of example.

The sensor, RFID, and/or the antenna may be printed. The foregoing may be printed in or on the label, or may be associated later with the label, such as using an adhesive, or by pressing these against an adhesive-backing on the label, by way of example.

Unlike the consumable container, the reader aspect may have a usable life that spans the exhaustion of a plurality of consumable containers, such as over a predetermined time period, such as over the course of a month, a year, 5 years, or the like. The reader may be embedded in a nearby appliance, or in a dispenser for the consumable, by way of example, and may be powered and/or battery-operated/rechargeable.

The reader may include one or more printed circuit boards that enable a communicative connection to the antenna on the container. The boards may provide some computer processing, and may include network communication capability modules, such as for communicating with a smart phone, local area network, cellular network, or the like, and/or may include aspects of the antenna or antennas discussed throughout. The boards may additionally include one or more power modules to provide power to the reader.

Figure 5B:
FIG. 5 is an illustration of aspects of the embodiments.

As illustrated in FIGS. 5A and 5B, further included in the embodiments may be: cloud based storage in communication with one or more of the readers; one or more smartphone apps for communication with the one or more readers and/or the cloud based communication site; and an analytics dashboard, which may be app and/or web-based, such as may be used by a consumer as well as a seller of the solid or liquid consumables and/or the containers thereof. As used herein, the "liquid level", "solids level", or "contents level" monitored in the disclosed apparatuses, systems and methods is indicative of the amount of contents remaining in a consumable container associated with aspects of the embodiments; a "dose" is an amount of contents properly used for a given purpose; and an "auto replenishment" may occur when the contents level in the consumable container reaches a point at which a reorder is required.

More particularly, a microprocessor, and the requisite processing power, to process data from which insights into contents and containers may be gained may be at least partially resident at the reader, and/or may be at least partially resident in the cloud. Further included may be firmware and software associated with the microprocessor to provide the functionality discussed throughout. For example, firmware may sense the contents level based on the intercommunication between the reader and the on-label antenna. On the contrary, dosing, and perhaps auto replenishment, may be information provided remotely from cloud-based algorithms to the firmware of the reader and/or the app of a smartphone. Thus, a variety of learning algorithms may be variably associated with a variety of consumables and/or containers, as discussed throughout.

As such, the firmware and software, using or absent intercommunication with the cloud or in association with cloud communication, may indicate and/or otherwise trigger an event, such as an auto-replenishment. This event may be manual, automatic or semi-automatic—a semi-automatic event may show a confirmation dialogue or other alert to the user, such as in the app, which may allow for the user to cancel or confirm; or, the event may be fully automated, i.e., may require no user interaction for the event.

An event may be communicated to the referenced cloud backend, such as subject to an additional confirmation, such as by an app alert or an email, to the consumer. Further, such an event may contribute to the data that may be provided to a brand, such as on a remote brand dashboard (information provided to a brand on a remote brand dashboard may, in certain contexts, be securely anonymized. Data associated with an event may include date, time, location, container ID, as well as sensed data.

Additional functional requirements of the cloud based backend may include storing and/or calculating data, including events, such as auto-replenishment events, dosing events, and content level events, by way of example, and may serve that data back to the smart phone app and/or to the dashboard as needed. Further, certain of the decision-making algorithms discussed herein throughout may also reside at the cloud based backend, such as rather than residing in a smart phone app or in association with the dashboard.

Further, the cloud-based backend may store and serve received data to and from the aforementioned app, and to or from one or more web-based or app-based dashboards. Some or all of the additional processing discussed throughout may be performed at the cloud based backend, such as alerts or email confirmations in the circumstances of events such as auto replenishment, such as instead of drawing on the limited resources of the reader's firmware or processors.

To provide an auto-replenishment event, for example, a user app may include various specific aspects, and may necessarily provide certain specific data. For example, the smart phone app may be enabled to discover and pair with the firmware of the reader, such as when the reader is activated or on, as mentioned above. The smart phone app may or may not display auto-replenishment requests or confirmation, such as in a user dialogue format. Further, the smart phone app may display a current level of the consumable in the container, and the frequency of updates of the level. Also indicated may be proper dosing and a consequent likely exhaustion timeframe.

Figure 6:
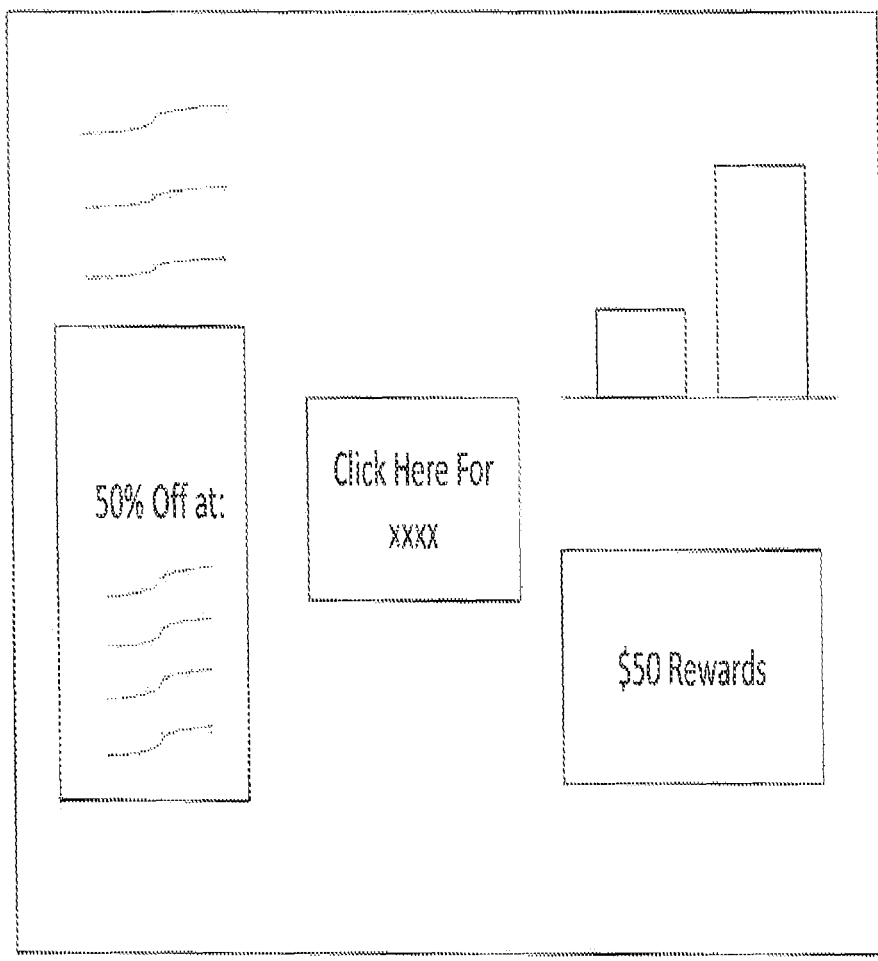
FIG. 6 is an illustration of aspects of the embodiments.

It is shown in FIG. 6 that the app may additionally include the capability to receive discounts and targeted advertising, such as from the remote brand dashboard. These may be in the form of a push notification or a user dialogue that provides an app alert to accept and/or apply a discount code, such as wherein the discount code may be saved for the next order or applied to a current order. Further, the communication capabilities disclosed herein may allow for enhanced value to sellers, such as by increasing brand loyalty, reorder frequency, and by providing experiential use data, by way of non-limiting example. In turn, it will be understood in light of the disclosed embodiments that the value to a user may be further enhanced, such as by providing for the offering of discounts from each brand, monitoring usage levels to a high-volume user, a user that complies with dosing or maintenance suggestions, or the like.

The dashboard may be associated with one or more sellers or brands of the referenced contents within the consumable. In such circumstances, an analytics dashboard may be available to the brand for user and use data indicative of certain geography use, global use, use at times of the day, use by demographic area, or the like. This and additional information provided at the dashboard may allow for a brand to target or otherwise send special offers, discount codes, or the like to particular users, such as high-volume users. Likewise, the consumer may be provided with a similar in-app "dashboard".

Of course, the app may include the ability to change any one or more of the foregoing settings or any additional settings, such as auto-replenishment settings, such as wherein the content level percentage threshold may be varied for an auto-replenishment indication, alarm settings, and so on. The app may also allow for changes in dosage settings, consumable type, container type, and the receipt of or application of discount codes, and so on. The foregoing may be available from a drop-down or similar menu, a pop-up window, or via any known user interaction, by way of example.

Yet further, auto-replenishment indications to be generated from the firmware may comprise intelligence within the user app or within a cloud backend. Accordingly, network communications may be triggered by changes in content level (such as continuously or periodically), the need for auto replenishment, or the like, and hence communications may occur on fixed time intervals, continuously, or at intervals of variable frequency. The smart phone app may communicate with the reader via, for example, NFC, WiFi, Bluetooth, BLE, or cellular communication methodologies, and further, the firmware of the reader may be suitable to batch information and data and/or otherwise piggyback to a smart phone having resident thereon the referenced app.

Auto-replenishment data may be provided to the consumer, a manufacturer, a brand, a retailer, and so on. For example, in Healthcare, for safety and security, and to ensure that prescriptions, for example, are re-filled when needed, the auto-replenishment alert may be sent directly to the manufacturer, and/or to a pre-entered pharmacy used by the consumer. For typical consumable packaging and items, such as dog or cat food, the alert may be linked to advertisements/promotions. For example, an auto-replenishment trigger may alert a provider regarding a need to replenish cat food, and may trigger a note to the subject consumer, either of the consumer's typically-purchased brand or of a competitive brand, that says "Looks like you may be low on cat food—here's a 50% OFF COUPON for "Love My Cat" cat food!"

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A smart container containing a consumable, comprising:
 a container body;
 a label affixed to the container body;
 a passive sensing tag (PST) included with the label, comprising at least:
  a backscatter antenna;
  a radio-frequency identification (RFID) communicative with the backscatter antenna; and
  at least one sensor communicative with the backscatter antenna;

wherein, responsive to a ringing from a radio frequency transceiver, the backscatter antenna provides the RFID and data from the at least one sensor to the radio frequency transceiver, and, in association with cloud communication of a minimum measured threshold of the consumable, providing auto replenishment based upon processing of the RFID and the sensor data;

wherein the backscatter antenna provides information from the at least one sensor using a gain and phase shift in response to the ringing to determine a content level of the container including the consumable for comparison to the minimum measured threshold; and wherein the RFID and the data are processed to provide usage information of the consumable to a user via a dashboard available at least on a smartphone and on a desktop.

2. The smart container of claim 1, wherein the container body comprises a non-metal.

3. The smart container of claim 2, wherein the container comprises plastic, glass or paper.

4. The smart container of claim 1, wherein the consumable is a liquid.

5. The smart container of claim 1, wherein the consumable is a solid.

6. The smart container of claim 5, wherein the solid is one of a powder, a gel and a gummy.

7. The smart container of claim 1, wherein the affixation of the label comprises an adhesive.

8. The smart container of claim 1, wherein the affixation of the label is removable.

9. The smart container of claim 1, wherein the data from the sensor is indicative of at least one of a type of the consumable, a level of the consumable, a temperature of the consumable, a humidity of the consumable, and a density of the consumable.

10. The smart container of claim 1, wherein the data processing comprises a comparator of the sensor data to numeric ranges previously deemed indicative of certain container and consumable characteristics.

11. The smart container of claim 10, wherein the numeric ranges are modified by machine learning stemming from feedback regarding propriety of the usage information.

12. The smart container of claim 11, wherein the machine learning comprises training of an artificial intelligence (AI).

13. A smart container containing a consumable, comprising:
   a container body;
   a label affixed to the container body;
   a passive sensing tag (PST) included with the label, comprising at least:
      a backscatter antenna;
      a radio-frequency identification (RFID) communicative with the backscatter antenna; and
      at least one sensor communicative with the backscatter antenna;
   wherein, responsive to a ringing from a radio frequency transceiver, the backscatter antenna provides the RFID and data from the at least one sensor to the radio frequency transceiver, and in association with cloud communication of a minimum measured threshold of the consumable, providing auto replenishment based upon processing of the RFID and the sensor data, wherein the backscatter antenna provides information using a gain and phase shift in response to the ringing;
   wherein the backscatter antenna provides primary characteristic information using the gain and phase shift in response to the ringing to determine a content level of the container including a consumable for comparison to the minimum measured threshold; and
   wherein the RFID and the data are processed to provide usage information of the consumable to a user via a dashboard available at least on a smartphone and on a desktop.

14. A smart container containing a consumable, comprising:
   a container body;
   a label affixed to the container body;
   a passive sensing tag (PST) included with the label, comprising at least:
      a backscatter antenna;
      a radio-frequency identification (RFID) communicative with the backscatter antenna; and
      at least one sensor communicative with the backscatter antenna;
   wherein, responsive to a ringing from a radio frequency transceiver, the backscatter antenna provides the RFID and data from the at least one sensor to the radio frequency transceiver, and in association with cloud communication of a minimum measured threshold of the consumable, providing auto replenishment based upon processing of the RFID and the sensor data, wherein the backscatter antenna provides information from the at least one sensor using a gain and phase shift in response to the ringing that are indicative of contents of the container including the consumable for comparison to the minimum measured threshold; and
   wherein the RFID and the data are processed to provide usage information of the consumable to a user via a dashboard available at least on a smartphone and on a desktop.

* * * * *